Patented Jan. 22, 1946

2,393,531

UNITED STATES PATENT OFFICE 2,393,531

CHEMICAL PROCESS

John L. Hart, Baytown, Tex., assignor to Standard Oil Development Company, a corporation of Delaware No Drawing. Application October 31, 1941, Serial No. 417,275

6 Claims. (Cl. 44—78)

The present invention relates to improvements in the preparation or synthesis of hydrocarbons boiling substantially within the gasoline range, and more particularly it relates to improved means for preventing the corrosion of distillation equipment employed in distilling the iso-paraffin olefin alkylate.

As is known, an iso-paraffin may be reacted with an olefin to form an addition product commonly called an alkylate. That is to say, isobutane may be reacted with butylene to form a condensation product which is saturated and which boils substantially within the gasoline range. Generally the alkylation reaction is carried out in the presence of concentrated sulfuric acid. The sulfuric acid and alkylate recovered from the reactor are usually discharged into a separation vessel where the sulfuric acid and the alkylate are permitted to stratify. From the separation vessel the sulfuric acid is withdrawn as a bottoms and recycled to the reaction zone. The alkylate, on the other hand, is taken off overhead, washed with caustic soda solution, then washed with water and then pumped to a charge tank from which it is subsequently withdrawn and charged into a debutanizer column. The debutanized alkylate is then charged to a fractionating column where the butane fraction and the octanes and lighter hydrocarbons in the case of butylene alkylate or the pentane fraction and octanes and lighter hydrocarbons in the case of pentylene alkylate are removed. The bottoms from this operation are then further reduced in a still for removal of any fractions suitable for use in motor gasoline but too high in boiling range for inclusion in aviation fuel.

The foregoing operation results in corrosion in the alkylate fractionating columns, in the reflux accumulators, in the transfer lines to the fractionating equipment, in the charge storage tanks, but the major corrosion has been found to occur in the fractionating column preheaters and reboilers.

An aqueous caustic soda (2% caustic) followed by a water wash has been employed for the elimination of $SO_2$ in the alkylate product going to the distillation unit charge tank. However, the use of caustic and water wash serve only to remove $SO_2$ and entrained acid, but has not prevented the corrosion and fouling tendency of the alkylate during subsequent handling and processing. It is believed that decomposition of esters in the preheating and reboiler system results in the formation of deposits and volatile acidic materials, such as $SO_2$, since tests have indicated that heating the alkylate product to temperatures comparable to those used in the fractionating unit reboilers will cause $SO_2$ to be liberated along with a tarry material which is deposited. The product of this unstable material is not an inherent characteristic of the alkylation reaction but is probably the result of side reactions varying with operating conditions since at times the decomposition effect is most severe and at other times almost entirely negligible.

It has been found that the introduction of small quantities (about 0.01% by volume based on the debutanized alkylate) of inhibitors, such as tricresol or petroleum phenols, into the alkylate product has served to reduce the corrosion tendencies. In these tests the alkylate product is debutanized by flash vaporization at atmospheric temperature before adding the inhibitor. Quantities of inhibitor varying from 0.001 to 0.01% by volume (based on the debutanized alkylate) were added and the inhibited material heated to 400° F. The vapors were tested during the heating period for $SO_2$ and the residue left after heating was tested for acidity and sulfate ion. The tests indicated that a minimum of 0.005% by volume and the maximum of 0.01% was desirable for reduction of decomposition during the heating. Tricresol and distilled crude petroleum phenols (produced by neutralization with $H_2SO_4$ of a 50° Bé. caustic wash applied to heating oils and cracked naphthas) were found to be equally effective as inhibitors. However, although it has been found desirable to add the amount of inhibitor specified above, 0.001 to 0.1% by volume (based on the debutanized alkylate) may be used.

In the succeeding five tests I have set forth the results found in inhibiting a debutanized alkylate and they are as follows:

Example 1

Alkylate debutanized, caustic and water washed and tested by heating in glass:

|  | Uninhibited | Tricresol added, vol. percent | | |
|---|---|---|---|---|
|  |  | 0.001 | 0.005 | 0.01 |
| Fouling temp., °F | 230 | 230 | None at 320 | None at 320 |

|  | Uninhibited | Petroleum phenols added, vol. percent | | |
|---|---|---|---|---|
|  |  | 0.001 | 0.005 | 0.01 |
| Fouling temp., °F |  | 235 | None at 320 | None at 320 |

Example 2

Alkylate debutanized, caustic and water washed and tested by heating in glass:

|  | Uninhibited | Tricresol added, volume per cent | | Petroleum phenols added, volume per cent | |
| --- | --- | --- | --- | --- | --- |
|  |  | 0.005 | 0.01 | 0.005 | 0.01 |
| Fouling temp., °F | 280 | 295 | 330 | 290 | 330 |
| $SO_2$ in vapors | Yes | Yes | Trace | Yes | Trace |
| Acid in bottoms | Yes | Yes | Trace | Yes | Trace |
| $SO_4$ in bottoms | Yes | Yes | Trace | Yes | Trace |

Example 3

Alkylate debutanized, caustic and water washed and tested by heating in glass:

|  | Uninhibited | 0.01 volume per cent tricresol added |
| --- | --- | --- |
| Fouling temperature, °F | 250 | 320 |
| $SO_2$ in vapors | Yes | No |

Example 4

Alkylate was debutanized, caustic and water washed and distilled with and without steam as follows:

| Dry distillation, uninhibited | | | +0.01% tricresol | | |
| --- | --- | --- | --- | --- | --- |
| Still temp., °F. | $SO_2$ in distillate | Still fouled | Still temp., °F. | $SO_2$ in distillate | Still fouled |
| 208 | No | No | 200 | No | No. |
| 220 | Yes | No | 290 | Yes | Slight. |
| 240 | Yes | Very heavily | 400 | Yes | Do. |
| 400 | Yes | do |  |  |  |

| Steam distillation, uninhibited | | | +0.01% tricresol | | |
| --- | --- | --- | --- | --- | --- |
| Still temp., °F. | $SO_2$ in distillate | Still fouled | Still temp., °F. | $SO_2$ in distillate | Still fouled |
| 208 | No | No | 200 | No | No. |
| 230 | No | No | 270 | Yes | No. |
| 260 | Yes | Yes | 280 | Yes | Slight. |
| 400 | Yes | Yes | 400 | Yes | Do. |

Example 5

A sample of alkylate was debutanized and 0.01 volume per cent of a mixture of monobutyl and di-butyl sulfates added to a portion of the alkylate.

Tests in glass gave the following results:

|  | Uninhibited | +0.1% tricresol |
| --- | --- | --- |
| Fouling temp., °F | 180 | None at 370. |
| $SO_2$ in vapor, at °F | 150 | None. |
| $SO_4$ in bottom | Slight | Do. |

The "tricresol" above referred to is a mixture of meta, ortho and para cresols. (Vide page 956, Hackh's "Chemical Dictionary" 1937, published by P. Blakiston's Sons & Co. Inc., 1012 Walnut Street, Philadelphia, Pa.) This product is sold commercially as a coal tar distillate boiling around 190° to 210° C. at one atmosphere.

To recapitulate, my present invention relates to improvements in the alkylation of iso-paraffins, and in its essence it involves treating the alkylate with a mono or polyhydric phenolic inhibitor which will decrease the tendency of the alkylate to corrode and/or foul the transfer lines, settling tanks, preheaters, reboilers, and fractionating equipment in which the raw alkylate is transferred and/or treated in order to produce a finished product. In other words, even though the raw alkylate is treated with caustic soda and later washed with water, it has been found that the thus washed product when reboiled or reheated in distillation equipment or the like, causes extensive corrosion and fouling of equipment employed. I have found that this corrosion tendency of the raw alkylate may be greatly minimized by adding to the alkylate a small amount of inhibitor such as mono or polyhydric phenols, either alkyl substituted or unsubstituted, including tricresol, petroleum phenols, pyrogallol, resorcinol, hydroquinone and the like.

Many modifications of my invention will readily suggest themselves to those familiar with this art.

I claim:

1. In an isoparaffin-olefin alkylation conducted in the presence of concentrated sulfuric acid in which the raw reaction product is subjected to distillation, the step of adding to the raw reaction product a small amount of a phenol to prevent corrosion of the distillation equipment.

2. A method according to claim 1 in which the phenol is a monohydric phenol.

3. A method according to claim 1 in which the phenol is tricresol.

4. A method according to claim 1 in which the phenol is derived from petroleum.

5. In the alkylation of isoparaffin with olefins where the reaction is carried out in the presence of concentrated sulfuric acid and the raw alkylate is subsequently distilled, the steps of treating the raw alkylate with a basic medium, thereafter washing it with water and then adding to it a small amount of a phenol prior to its distillation.

6. A method according to claim 5 in which the amount of phenol added is between about 0.005 and 0.1% by volume of the alkylate.

JOHN L. HART.